United States Patent [19]

Squires

[11] 3,928,532
[45] Dec. 23, 1975

[54] TREATING GAS WITH CHEMICALLY REACTIVE DUST IN PANEL BED

[76] Inventor: Arthur M. Squires, 245 W. 104 St., New York, N.Y. 10025

[22] Filed: Sept. 19, 1974

[21] Appl. No.: 507,386

[52] U.S. Cl. ............ 423/210; 423/215.5; 423/230; 423/241; 423/244; 55/71; 55/73; 55/74; 55/98
[51] Int. Cl.² .......................................... B01D 53/34
[58] Field of Search ........ 423/210, 220, 215.5, 230, 423/244, 240, 241; 55/71, 73, 74, 98

[56] References Cited
UNITED STATES PATENTS

| | | | |
|---|---|---|---|
| 3,296,775 | 1/1967 | Squires | 55/98 |
| 3,410,055 | 11/1968 | Zenz | 55/98 X |
| 3,770,338 | 11/1973 | Zenz | 55/98 X |
| 3,800,508 | 4/1974 | Zenz | 55/98 X |

OTHER PUBLICATIONS

Squires, "Air Pollution: The Control of $SO_2$ From Power Stacks Part II–The Removal of $SO_2$ From Power Stacks", Chemical Engineering, Nov. 20, 1967. pp. 133–140.

*Primary Examiner*—Earl C. Thomas
*Attorney, Agent, or Firm*—Abraham A. Saffitz

[57] ABSTRACT

A panel bed fitted for puffback cleaning is provided with an arrangement for supplying a precoating (i.e., surface deposits) of a fine chemically reactive particulate medium, significantly finer in size than the granular material charged to the panel bed, at each gas entry surface of the panel. The modified panel bed is advantageous for treating a gas with the chemically reactive particulate medium and is especially useful in a situation where a given solid chemical reactant can be readily supplied only in an exceedingly finely divided form, such as the calcium carbonate that results when calcium sulfide is reacted with liquid water and carbon dioxide gas. The calcium carbonate can be used in the modified panel bed at high temperature to remove hydrogen sulfide from a fuel gas made by gasifying a coal or residual oil of high sulfur content. The modified panel bed is also useful for removing radioiodine from a gas by adsorption by activated carbon while also removing micron-size radioactive particles by filtration.

13 Claims, 4 Drawing Figures

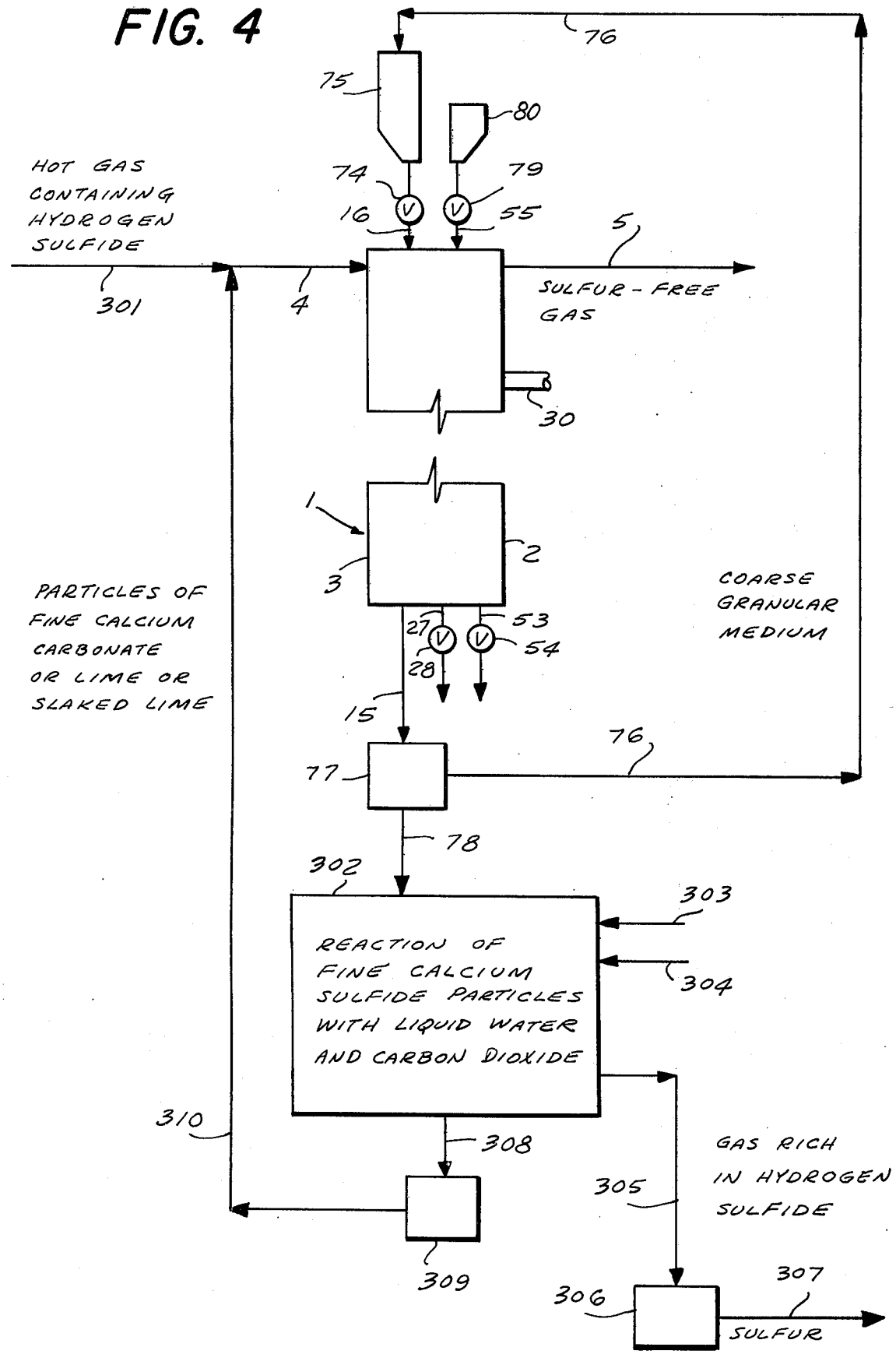

3,928,532

TREATING GAS WITH CHEMICALLY REACTIVE DUST IN PANEL BED

CROSS-REFERENCE TO RELATED APPLICATIONS

This application is related to my co-pending applications, filed on Aug. 28, 1974, numbered and entitled as follows:
1. Treating Gas and Granular Material in Panel Bed, Ser. No. 501,276
2. Filtering Dusty Gas in Panel Bed, Ser. No. 501,278
3. Countercurrent Contacting of Gas and Granular Material in Panel Bed, Ser. No. 501,277
4. Treating Gas and Fine Granular Material in Panel Bed, Ser. No. 501,275

The instant application is also related to my co-pending applications, filed simultaneously herewith, numbered and entitled as follows:
5. Electrostatic Filtration in Panel Bed, Ser. No. 507,387
6. Precoating Panel Bed for Filtering Aerosol of Micron-Size Particulates, Ser. No. 507,403
8. Treating Gas with Catalytic Dust in Panel Bed, Ser. No. 507,385
9. Solid-Gas Heat Exchange in Countercurrent Contacting of Gas and Granular Material in Panel Bed, Ser. No. 507,398
10. Treating Gas and Wetted Granular Material in Panel Bed, Ser. No. 507,377
11. Treating Liquid and Granular Material in Panel Bed, Ser. No. 507,376

The instant application is the seventh of this sequence.

FIELD OF THE INVENTION

The invention relates to the contacting of a chemically reactive dust with a gas by a panel bed of granular material having gas entry faces and fitted for puffback cleaning. In one aspect of the invention, it is useful for absorbing or adsorbing gaseous radioactive species in a gas stream by a chemically reactive powder. In another aspect, it is useful for removing sulfur dioxide from the products of combustion of a fuel containing sulfur by reaction of sulfur dioxide with a powder. In yet another aspect, it is useful for removing hydrogen sulfide from a fuel gas produced by gasifying coal or residual oil containing sulfur by reaction of hydrogen sulfide with calcium carbonate powder, or powdered lime or slaked lime derived therefrom, that has been provided by reaction of calcium sulfide with liquid water and carbon dioxide gas. In all aspects, the invention can simultaneously be useful in removing particulate matter from the gas undergoing treatment by filtration of this matter, including a dilute aerosol of micron-size particles.

DESCRIPTION OF THE PRIOR ART

My aforementioned co-pending application number (1), "Treating Gas and Granular Material in Panel Bed", furnishes a review of prior art relating to panel beds, with emphasis upon art relating to techniques for removing spent granular material, together with filtered dust if any is present, from fluid entry surfaces of such panels. I incorporate this review in the instant application by reference.

My earlier U.S. Pat. No. 3,296,775 (Jan. 10, 1967) taught a reverse surge flow of gas across a panel bed to produce a movement of the granular material in a mass toward the outer edges of louvers supporting gas entry faces, effecting a spill of the material from each face, and removing filter cake if present. The surge flow was to peak sharply to a flow substantially above the minimum steady flow rate at which a steady reverse flow of gas just causes motion of the granular material, and thereafter was to decline substantially immediately.

My aforementioned co-pending application number (1), "Treating Gas and Granular Material in Panel Bed", provides a more particular characterization of a reverse transient flow of gas (i.e., puffback) to produce a movement of granular material in mass (a "body movement") toward the gas entry faces of a panel bed.

My aforementioned co-pending application number (2), "Filtering Dusty Gas in Improved Panel Bed", provides an improved chevron louver for support of gas entry faces of a panel bed, with the advantage that filtered dust penetrating the bed is not dragged downward in the general motion of solid in the panel bed that follows puffback cleaning.

In an article in *Chemical Engineering* for Nov. 20, 1967, pages 133–140, I speculated that half-calcined dolomite might be charged to a panel bed according to the teaching of the aforementioned U.S. Pat. No. 3,296,775 to filter dust from a furnace burning a fuel of high sulfur content. Finely ground half-calcined dolomite would also be injected into the furnace. The solids removed by the reverse surge flow would be separated into fine material for discard, hopefully containing a high content of calcium sulfate, and into a coarse fraction partly to be recycled to the panel bed and fed thereto along with make-up fresh half-calcined dolomite and partly to be ground into a fine powder for injection into the furnace. The concept was that the panel bed of coarse and partly fresh stone would back up any desulfurization accomplished in the filter cake of finely ground stone that had passed through the furnace and been filtered from combustion products by the panel bed. The major question in the article was, at what temperature must the panel bed work? Some data were then available to suggest that a temperature appreciably below 1,100°F might be satisfactory, and the article announced my intention to perform experiments to try to answer the aforementioned question.

An article in *Journal of the Air Pollution Control Association*, volume 21, pages 272–276 (May 1971), of which I am a co-author, reported data showing that the panel bed according to the aforementioned speculative proposal would have to operate at a temperature at least as high as about 1,100°F and preferably higher. In most conventional steam boilers wherein the speculative method might be applied, the temperature 1,100°F appears within a steam-superheating section of the heat-transfer surface arrangement, and it would be inconvenient, requiring major changes in this arrangement, to furnish a gas from such boilers at this temperature for treatment in a panel bed. Convenient temperatures are at around 800° to 900°F between superheating surface and the economizer and at about 600° to 700°F between ecomomizer and air heater and at the stack temperature. Accordingly, the aforementioned data greatly reduces the potential utility of the speculative method. Additional data appear in a dissertation written by S. Narayanan for the Master of Science Degree from the City University of New York, 1971.

GENERAL DESCRIPTION OF THE INVENTION

As a result of experimentation in putting down a deposit of fly ash upon a static horizontal surface of sand, I have discovered particular procedures not hitherto disclosed whereby a surface layer deposit of a fine particulate solid such as fly ash can be put down on each gas entry surface of a panel bed substantially without cracks or pinholes or other defects that would permit gas to bypass the deposit and enter the panel bed without coming into intimate contact with the fine particulate solid. The deposits are coherent and tough, remaining relatively uninjured by vibrations and sudden changes in flow. The procedures, more fully described in the aforementioned co-pending application number (6), together with my aforementioned more particular characterization of a reverse transient flow for puffback cleaning and renewal of a panel bed, open for the first time the possibility of reacting a gas with a deposit of a fine powder on each gas entry face of a panel bed without it being necessary to back up the powder by presence of a chemically reactive material in the panel bed proper, as in the aforementioned speculative proposal.

OBJECTS OF THE INVENTION

An object of the invention is to provide a method for contacting a gas with a fine powder.

Another object is to provide a method for contacting a gas with a powder that can be provided conveniently only in a finely divided form.

Another object is to provide a method for removing radioactive gas species from a gas by their absorption or adsorption by a fine powder, and advantageously simultaneously with removal of fine radioactive dust particles.

Another object is to provide a method for removing sulfur dioxide from combustion products or smelter gases.

Another object is to provide a method for removing hydrogen sulfide from a fuel gas at high temperature.

Another object is to provide a method for contacting a gas with a fine powder at high temperature.

Another object is to provide a method for removing sulfur dioxide or hydrogen sulfide from a gas while also removing particulate matter by filtration with a granular material bed.

SUMMARY OF THE METHOD FEATURES OF THE INVENTION

My invention relates to an improved method of treating a gas through its contacting with a fine chemically reactive granular medium. Granular material is arranged in a bed having a plurality of transversely disposed, upwardly spaced, gas entry portions separated by interposed supporting members having outer and inner edges. The gas entry portions have gas entry faces that are substantially contiguous with these outer edges. The granular material is smaller than about 20 mesh, and preferably larger than about 100 mesh. The bed has gas exit portions spaced horizontally apart from the inner edges of the supporting members. A gas is caused to flow forwardly through the gas entry portions of the bed and outwardly from the gas exit portions without sudden variations in rate of flow while adding to the gas a fine granular medium, preferably at a rate less than about 10 grams per cubic meter ($gm/m^3$) of the gas, and better still, less than about 5 $gm/m^3$. The medium is preferably smaller than about 120 mesh, and is chemically reactive toward at least one chemical species present in the gas to be treated. The medium separates and accumulates in precoat surface layer deposits on the gas entry faces. The gas enters the gas entry faces at a velocity greater than about 16 feet per minute (ft/min) during at least a part of the step of putting down the surface layer deposits. Thereafter, a transient flow of gas is caused to move in the direction in reverse to the aforementioned flor of the gas to which the medium is added. The transient reverse flow produces first a rise (at a given rate of rise) and subsequently a fall in the pressure difference between the gas exit portions and the gas entry portions. This difference should remain greater than a first critical minimum difference for a time interval of less than about 150 milliseconds, and preferably less than about 50 milliseconds, this first critical minimum difference being that difference at which a steady flow of gas in the aforementioned reverse direction just produces a localized spill of granular material from the gas entry faces. The pressure difference produced by the transient reverse flow should peak to a top value beyond a second critical minimum difference, which is the pressure difference at which a transient flow of gas in the reverse direction, producing the second critical minimum difference at the aforementioned given rate of rise, just initiates a body movement of the granular material toward the gas entry faces to remove a portion of the granular material from the bed along with substantially all of the precoat surface layer deposits of the accumulated chemically reactive granular medium. The second critical minimum difference depends upon the rate of rise in the pressure difference, being larger the more rapid the rise. Granular material is added to the bed to replace material spilled from the gas entry portions of the bed. The cycle of putting down precoat surface layer deposits, as hereinbefore described, and of causing a transient flow of gas to move in the aforementioned reverse direction and of adding granular material to the bed is repeated two more times, and the precoat deposits are put down a fourth time. Gas to be treated is also caused to flow forwardly into and from the panel bed, this gas containing the chemical species toward which the granular medium is chemically reactive. The gas is treated through its contact with the precoat surface layer deposits. The cycle of operation, including the putting down of the precoat deposits and the treating of the gas to be treated, the causing of the reverse transient flow of gas, and the adding of granular material, is repeated in a cyclic manner. The granular medium spilled along with granular material from the gas entry faces following a gas-treating step is at least partially spent by the gas-treating reaction, i.e., at least part of the medium lacks further virtue for carrying out the reaction.

For convenience of reference, I use the term puffback for the specified reverse transient flow of gas and the term puffback cleaning to denote the operation whereby granular material is spilled from the gas entry portions of the panel bed.

The first aforementioned gas, that contains the fine granular medium to be deposited at gas entry faces, and the second aforementioned gas, the gas to be treated, are sometimes advantageously one and the same. In such a case, the fine granular medium is preferably added during an early part of the time interval in an amount stoichiometrically greater than that just required to perform the desired reaction for treatment of the gas, although sometimes satisfactory performance is obtained while adding the fine medium throughout the gas-treating time period.

The aforementioned velocity of 16 ft/min is approximately the lower limit for putting down a surface layer deposit of adequate toughness against spalling and cracking under influence of vibrations and hard knocks and sudden changes in gas flow that produce sudden changes in pressure difference across the deposits. I prefer a velocity greater than about 30 feet per minute for at least a portion of the step of putting down the surface layer deposits, and a velocity greater than about 60 ft/min is even better. The higher velocities have the virtue that the deposits put down more and deeper roots into the sand bed, tying the deposits to the bed and rendering the deposits tougher and more resilient, as explained in greater detail in the aforementioned co-pending application number (6).

If a higher efficiency of contacting of gas and the deposits is desired, it is advantageous to put down a first portion of the deposits at the aforementioned higher velocities, but in any case at a velocity greater than about 16 ft/min, and subsequently to put down a second portion of the deposits at a velocity below about 16 ft/min and preferably below about 12 ft/min. The second portion has the effect of closing up pinhole defects in the first portion, i.e., craters or pinholes in the deposits through which gas can pass directly into the granular material bed, substantially bypassing the deposit and escaping treatment. For a fuller discussion of the role and effect of the later step of putting down a second portion of the deposits at a low velocity, see the aforementioned co-pending application number 6.

An example where the gas that deposits the medium and the gas to be treated are often advantageously the same gas arises from the need to remove hydrogen sulfide from a fuel gas to be burned promptly, such as a fuel gas made by gasification of a heavy residual oil of high sulfur content or of a high-sulfur coal. The method of the invention is particularly advantageous for providing for the first time a practicable method for using a particular form of calcium carbonate in a process for removing sulfur species such as hydrogen sulfide from a fuel gas at high temperature. The particular form of calcium carbonate arises from the well-known reaction of calcium sulfide, the product of the desulfurization process, with liquid water and carbon dioxide. This calcium carbonate appears in an extremely finely divided form, such as cannot be maintained in either a fixed bed or a gravitating bed or a fluidized bed of the art. Proposals have been made [see for example German Patent No. 1,184,895 (Jan. 7, 1965)] to contact the fine calcium carbonate with a hot fuel gas in a dilute suspension, but this idea has disadvantages (arising mainly from the poorness of the gas-solid contacting and the difficulty of separating the finely divided particulate reaction product from the treated gas), and I understand that a vigorous German effort to develop such a proposal during the middle 1960's has now been abandoned. The fine calcium carbonate powder (or finely divided lime or slaked lime produced from the powder) could advantageously be maintained in precoat surface layer deposits on a panel bed for absorbing hydrogen sulfide from hot fuel gas made by gasifying coal or heavy fuel oil. The resulting calcium sulfide could then advantageously be reacted with liquid water and carbon dioxide to yield fine calcium carbonate powder for re-use. The reaction with liquid water and carbon dioxide would yield a gas rich in hydrogen sulfide that could be converted to elemental sulfur by known procedures.

Another example where the gas to put down the deposits and the gas to be treated are often advantageously the same gas is for the removal of sulfur dioxide from a gas, such as the products of combustion of a fuel containing sulfur or the offgases from a smelter treating a sulfide metal ore. Precoat particles of finely divided slaked lime, slaked fully-calcined dolomite, magnesium hydroxide, nahcolite, sodium carbonate, ammonium carbonate, or other absorbent for sulfur dioxide could advantageously be added to the gaseous products of combustion to be treated during an early part of the gas-treating time period.

In both of the foregoing examples, the panel bed with surface deposits affords the advantage that it can remove particulate matter while also removing hydrogen sulfide or sulfur dioxide from the gas undergoing treatment.

SUMMARY OF METHOD FEATURES FOR ULTRA-HIGH EFFICIENCY OF CONTACTING

In some situations, better efficiency will be wished for than the abovedescribed procedures will afford, and a more particular method for putting down the precoat surface layer deposits will be preferred. For example, one might wish to remove a radioactive gas species, such as radioiodine, by chemical absorption or adsorption by a fine granular medium such as activated carbon. The more particular method that I recommend is a three-increment procedure in which a first increment puts down roots attaching the subsequently deposited material firmly to the sand bed, a second increment builds up a coherent deposit of relatively low porosity but containing in general a number of pinhole defects through which gas can bypass the surface deposit and enter directly into the granular material bed, and a third increment to close up the pinholes and improve efficiency of a subsequent use of the deposit to treat a gas. In the three-increment procedure, described and elucidated in greater detail in the aforementioned co-pending application number (6), the gas to which the granular medium is added first flows forwardly to enter the gas entry faces at a first velocity greater than about 16 ft/min (preferably greater than about 60 ft/min). A first increment of the medium is added to the gas until the medium separates and accumulates in surface layer deposits that produce a pressure drop in the gas of at least about 0.05 centimeters of water (cm) per ft/min of the first velocity. The gas then flows at a rate to enter the gas entry faces at a second velocity greater than about 16 ft/min (preferably greater than about 30 ft/min) while a second increment of the medium is added to the gas until the pressure difference across the deposits further increases by at least about 0.08 cm/(ft/min) 0.08 preferably by at least about 0.1 cm/(ft/min). Subsequently, the rate of flow of the gas is reduced so that the gas enters the gas entry faces at a third velocity which is less than about one-half of the first velocity and of the second velocity and also less than about 16 ft/min. A third increment of the medium is added to the gas flowing at the reduced rate of flow. The third increment of the medium is at least about 1 times as large, and preferably at least about 1.5 times as large, as the second increment when the aforementioned pressure drop increased by about 0.08 cm/(ft/min) with the addition of the second increment, and when the pressure drop increased by a substantially greater amount, the third increment is at least about 1 times as large, and preferably at least about 1.5 times as large, as the pro rata portion of the second increment that was responsible for an increase of exactly 0.08 cm/(ft/min).

For better performance, the second increment preferably increases the pressure drop by at least about 0.1 cm/(ft/min) and advantageously by at least about 0.15 cm/(ft/min). The third increment is preferably at least 1.5 times as large as the second increment when the pressure drop increased with the addition of the second increment by about 0.1 cm/(ft/min), and when the pressure drop increased by a substantially greater amount, the third increment is preferably at least 1.5 times as large as the pro rata portion of the second increment that was responsible for an increase of exactly 0.1 cm/(ft/min).

It will be understood that for ultra-high efficiency, it is preferable to put down precoat surface layer deposits with another gas, not the gas to be treated, during three complete cycles of putting down the deposits, removing them by puffback cleaning, and adding new granular material to the panel bed. Only after the fourth precoat surface layer deposits are in place is it advisable to begin treatment of a gas containing a radioactive gaseous species, for example, for removal of the gas at an ultra-high efficiency. As explained in the aforementioned co-pending application number (6), the fourth precoat surface layer deposits are tougher and more coherent than the first deposits, and the improvement is progressive through the first three deposits put down and removed by puffback cleaning.

The method for ultra-high efficiency of contacting is also effective in providing surface layer deposits that separate and accumulate micron-size particulates, i.e., particles less than about 10 microns in size, if such be present in the gas to be treated. Accordingly, the procedure is useful for removing radioactive micron-size particulate matter as well as gaseous radioactive species such as radioiodine.

BRIEF DESCRIPTION OF THE DRAWINGS

The invention will be more particularly described in conjunction with the following drawings wherein:

FIG. 4 is a schematic diagram illustrating use of the invention in a process for desulfurizing a hot fuel gas.

DESCRIPTION OF THE PREFERRED EMBODIMENTS

Figure 1:
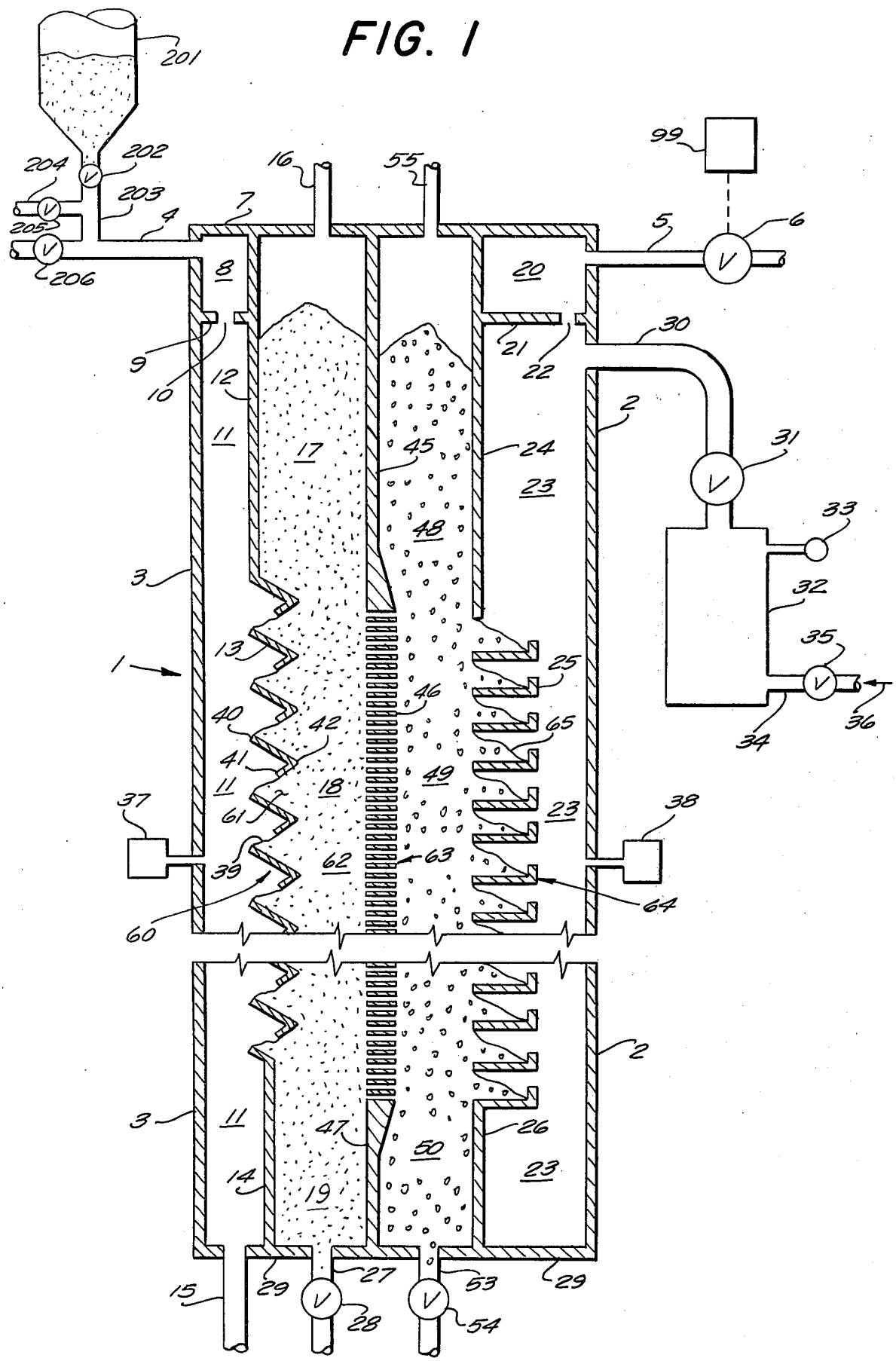
FIG. 1 is a vertical section view of a preferred panel bed gas-solid contactor with provision for providing a precoat of fine particles on gas entry faces.
Figure 2:
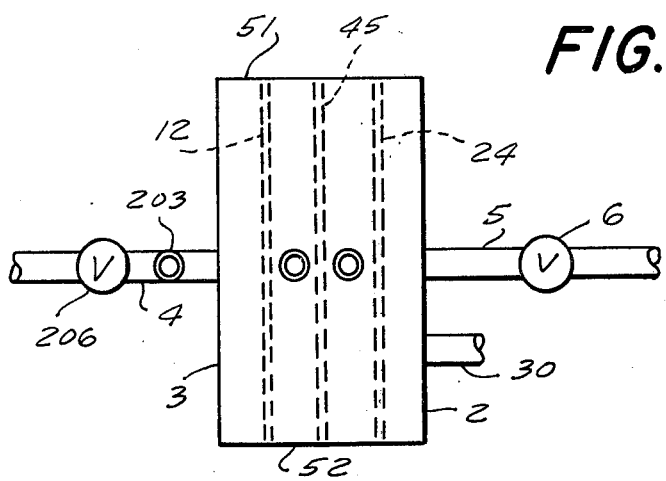
FIG. 2 is a top view of the panel of FIG. 1.

In the several figures, like reference numerals refer to like parts having like functions. In FIG. 1 the panel bed gas-solid contactor 1 comprises a casing of rectangular cross-section having opposed side walls 2 and 3 and top plate 7 and bottom plate 29. Opposed edge walls 51 and 52 are to be seen in FIG. 2, a top view. A generally vertical bed of granular filter material 18 is within the casing and retained by vertically extending, horizontally spaced-apart, perforate walls 60 and 63. Granular material is supplied by gravity feed to bed 18 from supply bed 17, retained between imperforate walls 12 and 45. Additional granular material may be added to bed 17 from pipe 16. Granular bed 18 may be drained, if desired, via space 19 between walls 14 and 47, normally filled with static granular material, by means of pipe 27 and valve 28. Perforate wall 63 comprises a series of horizontal louvers or slats 46 mounted one above another in a structure resembling subway grating and narrowly spaced apart in the vertical direction. Horizontally spaced apart from wall 63 is perforate wall 64 comprising a series of generally horizontal louvers or slats 25 also mounted one above another. Granular material bed 49, comprising material considerably coarser in size than the material of bed 18, is retained by perforate walls 63 and 64, and is supplied from supply bed 48, retained between imperforate walls 45 and 24. Additional granular material of the coarser character may be added to bed 48 from pipe 55. Granular bed 49 may be drained, if desired, via space 50 between walls 47 and 26, normally filled with static granular material, by means of pipe 53 and valve 54. Walls 12, 60, 14, 3, 51, and 52, bottom 29, and partition 9 enclose gas entry compartment 11, to which gas to be treated is supplied from pipe 4 via plenum space 8 and slot 10 in partition 9 (the slot 10 preferably extending from wall 51 to wall 52). Walls 24, 64, 26, 2, 51, and 52, bottom 29, and partition 21 enclose gas exit compartment 23, from which gas leaves via slot 22 in partition 21 (the slot 22 preferably running from wall 51 to wall 52) via plenum space 20 to pipe 5. Louvers 25 cooperate to support gas exit surfaces 65 of bed 49.

Perforate wall 60 comprises a series of members 13. A member 13 typically has an upper surface with outer edge 40 and inner edge 42 in respect to granular bed 18, and cooperating therewith a lower surface with outer edge 41 and inner edge 42, the two inner edges being articulated together in an edge joint. The perforations of wall 60 are to be considered as being formed between respective inner edge joints 42 of adjacent members 13. The members 13 are mounted in a manner such that they cooperate to support gas entry portions 61 of bed 18, viz., the angle of a line drawn through edge 41 of a given member and edge 40 of the next subjacent member should preferably be less than about 25° from the horizontal, an angle less than the angle of repose of most granular materials that might preferably be employed in bed 18. It will be seen that the gas entry portions 61 are transversely disposed, upwardly spaced, and separated by the interposed suppporting members 13, the gas entry portions having gas entry faces 39 that are substantially contiguous with outer edges 40. A line drawn through edge 41 of a typical member 13 and edge joint 42 of the subjacent member 13 is inclined at an angle less than about 60° from the horizontal. Gas exit portions of bed 18 are seen generally at 62, and are spaced from edge joints 42.

Pipe 30 connects gas exit compartment 23 with tank 32, quick-opening valve 31 being provided to isolate tank 32 from space 23. Tank 32 is connected to source 36 of gas under pressure via line 34 and valve 35. Pressure gauge 33 is provided to help adjust the pressure of gas in tank 32.

Hopper 201 is provided for holding a granular material substantially smaller than the granular material of bed 18. The finer granular material of hopper 201 can be introduced into gas flowing in pipe 4 toward plenum 8 by opening valve 202. Line 4 is provided with valve 206, and an alternative source of gas to pipe 4 is provided from pipe 204 fitted with valve 205.

Figure 3:
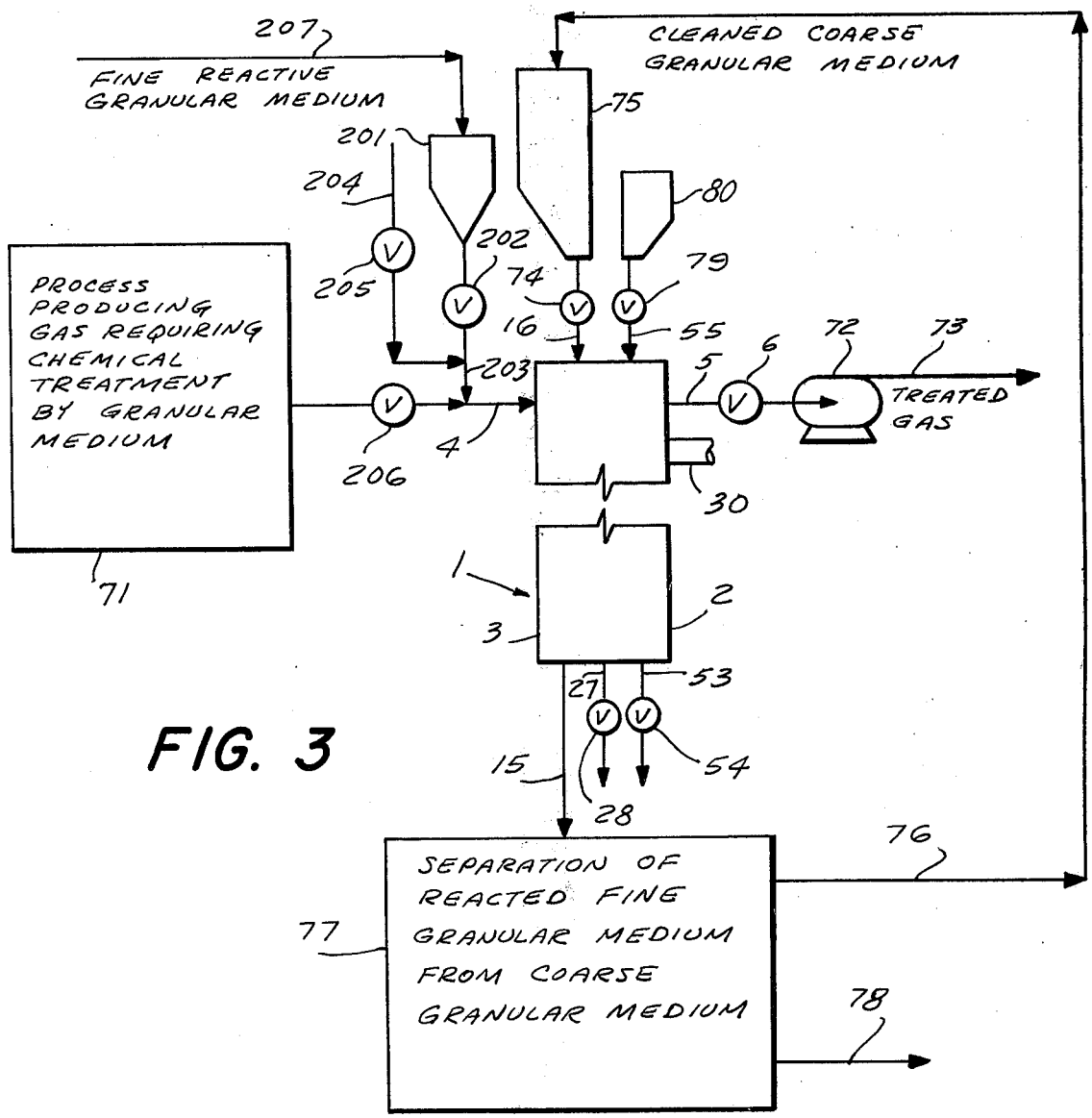
FIG. 3 is a schematic diagram illustrating use of the invention to contact a gas with a fine reactive granular medium.

In operation of gas-solid contactor 1, the panel bed is initially charged with a first granular material, such as a quartz sand substantially smaller than 20 mesh (U.S. Standard) and preferably larger than about 100 mesh, from line 16, filling spaces 19, 18, and 17 as shown in FIG. 1. Spaces 50, 49, and 48 are also charged with a second coarser granular material, from line 55, such as quartz sand of about 10–14 mesh. A fine chemically reactive granular medium is supplied to hopper 201. Panel bed 1 is connected to a process producing a gas requiring chemical treatment by a granular medium, seen at 71 in FIG. 3, via gas-entry pipe 4. A precoat of the fine reactive granular medium is laid down on the gas entry surfaces 39 of bed 18 in a manner hereinafter described, and gas from process 71 is caused to flow forwardly through panel bed 1 by opening valve 6 in pipe 5 and valve 206 in pipe 4. Blower 72 is provided to carry gas from pipe 5 to line 73 for conducting treated gas from the system. Periodically, tank 32 is filled with gas at pressure from supply 36, valve 35 is closed, valve 6 is closed to interrupt the flow of gas being treated, and valve 31 is opened quickly to produce the specified transient reverse flow from compartment 23 to compartment 11. Pipe 15 is provided to withdraw precoat medium along with granular material spilled from surfaces 39. As seen in FIG. 3, pipe 15 advantageously conducts the spilled solids to means 77 for separating the fine reactive granular medium, now spent by the chemical treatment of the gas, from the granular material provided to bed 18, for example, by screening or elutriating the fine particles away from the granular material. Pipe 78 is provided for withdrawal of the spent fine medium from means 77, and pipe 76, for return of granular material to supply hopper 75, from which the material may be returned to bed 18 via valve 74 and pipe 16. Supply hopper 80 may conveniently be provided to hold the aforementioned second, coarser granular material in readiness for supply to spaces 48, 49, and 50 via valve 79 and pipe 55. After a few seconds for dust to settle to the bottom of compartment 11, valve 31 is closed, and valve 6 is opened to resume treatment by the freshly cleaned bed 18.

Transducers 37 and 38, seen in FIG. 1, are conveniently provided in a test to determine the aforementioned first and second critical minimum pressure differences between space 23 and space 11, although competent fluid dynamicists will be able to calculate instantaneous pressure difference versus time in a test of puffback, given the porosity of beds 18 and 49, the size of valve 31, the speed of its opening, the size of tank 32, the pressure therein, the length and the diameter of line 30, and the dimensions of compartment 23. Tests for determining the critical pressure differences and illustrating the suitable limits on the time interval during which the puffback maintains the reverse pressure difference above the first critical minimum difference are discussed more fully in my aforementioned co-pending application number (1), "Treating Gas and Granular Material in Panel Bed", together with representative data, and this discussion is incorporated herein by reference. In brief, a time interval of about 150 milliseconds represents an approximate upper limit for acceptable performance, beyond which spills from individual gas entry surfaces 39 become badly distributed, there being far more spill from surfaces near the top of a panel like that seen in FIG. 1 than from surfaces near the bottom, and beyond which spills also partake disadvantageously more of the character of a localized spill and less of the character of the preferred body movement. A practical minimum time interval for operation of the arrangement of FIG. 1 appears to be about 3 to 5 milliseconds, given the practical requirement that space 23 must be large enough to accommodate a flow of gas leaving wall 64. It should be noted, however, that one might, for example, achieve an extremely short time interval by mounting a large number of blank cartridges on wall 2 and by firing them simultaneously to discharge gas explosively into space 23; or one might provide an arrangement whereby wall 2 might be displaced almost instantaneously toward wall 64.

I have conducted extensive experiments in which I deposited a layer of fly ash from the combustion of pulverized coal upon a horizontal surface of quartz sand. The fly ash that I used was substantially smaller than 120 mesh, about 3 per cent being removed if it was sieved through a 120-mesh screen. The experiments are more fully described in the aforementioned co-pending application number (6), and this discussion is incorporated herein by reference. My experiments showed that it is difficult to put down a coherent deposit of granular medium finer than about 120 mesh upon the surface of a quartz sand larger than about 20 mesh, when the medium has an adhesivity toward sand and an autohesivity comparable to fly ash. A larger granular material may be used if the medium has higher adhesivity toward the material and a higher autohesivity. See the discussion of adhesivity and autohesivity in the aforementioned co-pending application number (6). In the course of the experiments, I discovered procedures for putting down tough, coherent deposits of fine granular medium on gas entry surfaces 39 of bed 18 as well as for preserving the coherency of the deposits during their use.

Where a high efficiency of treatment is desired, as for the removal of a radioactive species from a gas by adsorption or absorption by a suitable fine reactive granular medium, a high degree of coherency of the deposits as well as toughness in the deposits would be desired. For this circumstance, I recommend the following procedure. Bed 18 would be charged with 40–50 mesh quartz sand. Blower 72 would be started, and valves 6 and 205 would be opened to connect blower 72 with a source of clean gas, advantageously atmospheric air, via pipe 5, panel bed 1, pipe 4, pipe 203, and pipe 204. Control means 99 (seen in FIG. 1) would regulate the opening of valve 6 to maintain the flow at a rate such that the velocity of the clean gas passing across gas entry faces 39 is preferably at least about 60 ft/min, and higher if convenient. Valve 202 would be opened to cause the fine chemically reactive granular medium to flow from hopper 201 via pipe 203 into pipe 4 along with the clean gas and to be carried to gas entry faces 39 where the medium would accumulate in deposits. A deposit would be allowed to accumulate until the pressure drop reaches about 0.3 to 0.5 cm/(ft/min), and the panel bed 1 would be cleaned and renewed by puffback as hereinbefore described. This cycle would be repeated at least about twice, for a total of three puffback cleanings, to condition the sand in the panel bed 18, that is, to make it a bit dirty with the granular medium so that succeeding deposits put down better roots and are more coherent and have fewer pinholes. The three-increment procedure for producing a surface layer deposit for use in treating the gas would then be put into effect. A first increment of the medium would be put down, preferably at the aforementioned velocity of 60 ft/min or greater, until the pressure drop reaches about 0.05 cm/(ft/min). A second increment would be put down, again preferably at 60 ft/min or greater, until the pressure drop reaches at least about 0.15 cm/(ft/min), and preferably about 0.25 cm/(ft/min). Then a third increment would be put down, preferably at a velocity between about 8 and 12 ft/min, although satisfactory results are obtained at a velocity below 8 ft/min and between 12 and 16 ft/min. The third increment should be at least about 1.5 times, and preferably 2 times, the pro rata portion of the second increment responsible for a pressure drop increase of about 0.1 cm/(ft/min). After the desired deposit is put down, flow of gas from source 204 via valve 205 would be stopped, be opened to commence treatment of the gas. Treatment would continue until the granular medium is substantially spent, and thereafter, puffback can clean and renew the panel bed, so that the cycle of operation can be repeated.

It is desirable that there be no sudden changes in rate of flow of the gas across panel bed 1, and control means 99 is conveniently arranged to ensure that valve 6 does not change its position except slowly.

If ultra-high efficiency of contacting is not required, so that a reduced efficiency can be tolerated during an early part of a gas-treating period between successive puffback cleanings, the surface layer deposits of active medium may advantageously be put down with use of the gas to be treated, and pipe 204 and valve 205 may be omitted.

Best performance will be achieved if panel bed 1 is mounted so that it is free of vibrations that might spall the deposits into space 11 or crack them open and spoil their coherency. If vibration-free mounting is not possible, it would be advantageous to provide for sufficient bonds between adjacent particles of the fine catalytic medium to produce a reticulated network of particles in three dimensions. The bonds need not be very strong, but only just strong enough to provide the network with sufficient strength to resist cracking by vibrations of the type to be encountered or by typical expected change and rate of change in pressure drop. For each anticipated situation, the strength and number of the bonds are best determined by adjustment to the specific operating conditions, it being within the expected skill of the operator to adjust reticulation and to enhance reticulation as required or to diminish reticulation to the minimum just desirable for given operational circumstances.

The aforementioned co-pending application number (6) gives a discussion of reticulating agents, and I incorporate this discussion herein by reference. In brief, a solution or suspension or emulsion of a sticky material in a liquid can be introduced as a fine mist and admixed with the active granular medium, the liquid subsequently evaporating from the surface layer deposits. Many sticky materials can serve, including sodium silicate, asphalt, many polymerized or polymerizable materials, and so forth. A cementitious material, especially a quick-setting cement, can be used with supply of a little moisture for its hardening. It will be evident that the number and character of the bonds among the particles must be such that the reticulated network of granular medium particles remains porous to flow of the gas to be treated and that the medium retains its virtue for the desired gas treatment.

For operation of panel bed 1 to remove sulfur dioxide from combustion products or to remove hydrogen sulfide from a fuel to be burned promptly, the bed would advantageously be charged with 20–30 mesh quartz sand, or sometimes preferably with 40–50 mesh sand if better efficiency of removal is desired. In these applications, it will sometimes be preferable to omit pipe 204 and valve 205 and use the gas to be treated to put down the surface deposits.

FIG. 4 shows how panel bed gas-solid contactor 1 can be used to remove hydrogen sulfide and other sulfur species from a hot fuel gas, produced for example by gasification of coal or residual oil with air or air and steam or oxygen and steam. The hot gas would be supplied from line 301, and fine particles of calcium carbonate or preferably lime or slaked lime would be introduced into the gas from line 310, either continuously at a rate to supply reactive calcium species substantially matching stoichiometrically the hydrogen sulfide and other sulfur species in the hot gas, or in larger amount at the beginning of a treating cycle, as hereinbefore described. The combined flow of gas and fine particles would pass into panel bed 1 via line 4, and fuel gas of reduced sulfur content would leave via line 5. Solids spilled by puffback would pass via line 15 to solid separating means 77, from which coarse granular medium would return to hopper 75 and spent fine particles containing calcium sulfide would pass via line 78 to means 302 to reacting calcium sulfide in the fine particles with liquid water supplied from line 303 and carbon dioxide gas supplied from line 304. Means 302 supplies a gas rich in hydrogen sulfide via line 305 to known means 306 for converting hydrogen sulfide to elemental sulfur, delivered via line 307. In means 302 the fine particles are converted to fine particles of calcium carbonate, that are advantageously delivered via line 308 for treatment in means 309 before the material is returned via line 310 for introduction into the hot gas. Treatment 309 advantageously comprises the drying of the particles, and sometimes advantageously includes their calcination, and also sometimes advantageously includes their slaking after calcination. If the gas to be treated is sufficiently hot and contains carbon dioxide at a sufficiently low partial pressure so that calcium carbonate particles are calcined when they are introduced into the hot gas, means 309 advantageously comprises drying only. If the gas to be treated is not sufficiently hot to calcine calcium carbonate introduced therein but is above about 1200°F, means 309 advantageously includes calcination. If the gas is below about 1200°F, means 309 advantageously includes slaking as well as calcination.

If the hot gas in line 301 is available at a substantially elevated pressure, such as a pressure greater than about 4 atmospheres, improved heat economy will be attained if a major portion of the fine particles containing calcium sulfide in line 78 are sent to a step for reacting the calcium sulfide with steam and carbon dioxide at a temperature below about 1300°F and at substantially the elevated pressure of the hot gas in line 301, in accordance with the teachings of U.S. Pat. No. 3,402,998 (Sept. 24, 1968), to provide a gas rich in hydrogen sulfide to join the gas in line 305. This step would advantageously be conducted by the method of the instant invention, wherein the fine particles containing calcium sulfide would be put down as surface layer deposits on gas entry faces of a panel bed and steam and carbon dioxide would be caused to flow forwardly into and through the panel bed. The combination of this step with means 302 of FIG. 4, that would deal with a minor part of the calcium sulfide particles of line 78, would have the advantage of maintaining higher reactivity in the particles of calcium carbonate resulting from the treatment of calcium sulfide with steam and carbon dioxide. In repeated cyclic use of calcium carbonate (or of calcium oxide derived from the carbonate) for removing hydrogen sulfide with repeated restoration of calcium sulfide to the calcium carbonate form through the agency of steam and carbon dioxide, there is a tendency for calcium sulfide to accumulate in the particle in a chemically inert form. This tendency would advantageously be checked by restoring a part of the calcium sulfide to the calcium carbonate form through the agency of liquid water and carbon dioxide, and the reactivity of the calcium carbonate thereby maintained in repeated cyclic use. The combination is especially attractive if particle treatment means 309 includes drying of the particles from means 302 and also both calcination and slaking of both these particles and also the restored calcium carbonate particles from the reaction of calcium sulfide with steam and carbon dioxide.

It should be noted that the porosity of granular material bed 18 should be brought initially to the uniform porosity appropriate for the puffback intensity selected for operation, as discussed more fully in my aforementioned application number (1), "Treating Gas and Granular Material in Panel Bed". Specifically, it is advantageous to subject the panel bed initially to a strong puffback at an intensity exceeding that specified herein, or to discharge a controlled quantity of granular material from the bottom of the panel bed.

I do not wish my invention to be limited to the particular embodiments illustrated in the drawings and described above in detail. Other arrangements will be recognized by study of my aforementioned co-pending applications and by those skilled in the art, as well as purposes other than those discussed herein which the invention can advantageously serve.

I claim:

1. The method of treating a gas including its contacting with a fine chemically reactive granular medium, comprising:
    a. arranging granular material smaller than about 40 mesh in a panel bed having a plurality of transversely disposed upwardly spaced gas entry portions separated by interposed supporting members having outer and inner edges with respect to the bed wherein said gas entry portions have gas entry faces substantially contiguous with said outer edges and wherein said bed has gas exit portions spaced from said inner edges;
    b. forwardly flowing gas through the gas entry portions of the granular material bed and outwardly from the gas exit portions while adding to said gas a chemically reactive granular medium substantially smaller than about 120 mesh to separate and accumulate said medium in surface layer deposits at said gas entry faces wherein said gas enters said gas entry faces at a velocity greater than about 16 feet per minute during at least a part of this step (b);
    c. stopping the forward flow of said gas of step (b);
    d. causing a transient flow of gas to move in the direction in reverse to the flow of said gas in (b);
    e. said transient reverse flow producing first a rise at a given rate of rise and subsequently a fall in the pressure difference between said gas exit portions and said gas entry portions, said difference remaining greater than a first critical minimum difference for a time interval of less than about 50 milliseconds, said first critical difference being that difference at which a steady flow of gas in said reverse direction just produces a localized spill of said first granular material from said gas entry faces, and said difference produced by said transient reverse flow peaking to a top value beyond a second critical minimum difference, which is the pressure difference at which a transient flow of gas in said reverse direction producing said pressure difference at said rate of rise just initiates a body movement of said first granular material toward said gas entry faces to spill a portion of the granular material and substantially all of said accumulated chemically reactive granular medium from the bed;
    f. supplying fresh granular material to replace material spilled from said gas entry portions;
    g. repeating the cycle of said steps (b), (c), (d), (e), and (f) at least two times;
    h. forwardly flowing gas through the gas entry portions of the granular material bed and outwardly from the gas exit portions while adding to said gas a first increment of said chemically reactive granular medium at a rate of addition less than about 5 grams per cubic meter of said gas to separate and accumulate said medium in surface layer deposits at said gas entry faces wherein said gas enters said gas entry faces at a first velocity greater than about 16 feet per minute until the pressure drop across said surface layer deposits reaches about 0.05 centimeters of water per foot per minute of said first velocity and then adding to said gas a second increment of said medium at a rate of addition less than about 5 grams per cubic meter of said gas while the gas enters said gas entry faces at a second velocity greater than about 16 feet per minute until said pressure drop increases by at least about 0.1 centimeters of water per foot per minute of said second velocity and wherein subsequently the rate of flow of said gas is reduced so that the gas enters said gas entry faces at a third velocity less than about one-half of said first velocity and of said second velocity and also less than about 16 feet per minute while adding to said gas at a rate of addition less than about 5 grams per cubic meter of said gas a third increment of said medium wherein said third increment is at least about 1.5 times as large as said second increment when said pressure drop increased with the addition of said second increment by about 0.1 centimeters of water per foot per minute and wherein, when said pressure drop increased by a substantially greater amount, said third increment is at least about 1.5 times as large as the pro rata portion of said second increment that was responsible for an increase of exactly 0.1 centimeters of water per foot per minute;
    i. stopping the forward flow of said gas of step (h) and forwardly flowing gas to be treated at a rate to enter said gas entry faces at a velocity not substantially greater than said third velocity and thereby treating said gas by contact with said surface layer deposits of said chemically reactive medium;

j. stopping the forward flow of said gas of step (i); and k. repeating steps (d), (e), (f), (h), (i), and (j) in a cyclic manner.

2. The method of claim 1 in which said gas to be treated contains micron-size particulate matter and wherein said spill from said gas entry faces includes accumulated particulate matter removed from said gas to be treated.

3. The method of claim 1 in which said gas contains gaseous radioactive chemical species and wherein said chemically reactive granular medium is absorptive or adsorptive in respect to said species.

4. The method of claim 3 in which said species include radioiodine and wherein said chemically reactive granular medium is activated carbon.

5. The method of claim 1 in which said first velocity of step (h) is greater than about 60 feet per minute and wherein said second velocity of step (h) is greater than about 30 feet per minute.

6. The method of treating a gas involving its contacting with a fine chemically reactive granular medium, comprising:

a. arranging granular material smaller than about 20 mesh in a panel bed having a plurality of transversely disposed upwardly spaced gas entry portions separated by interposed supporting members having outer and inner edges with respect to the bed wherein said gas entry portions have gas entry faces substantially contiguous with said outer edges and wherein said bed has gas exit portions spaced from said inner edges;

b. forwardly flowing gas through the gas entry portions of the granular material bed and outwardly from the gas exit portions while adding to said gas a chemically reactive granular medium substantially smaller than about 120 mesh to separate and accumulate said medium in surface layer deposits at said gas entry faces wherein said gas enters said gas entry faces at a velocity greater than about 16 feet per minute during at least a part of this step (b);

c. thereafter causing a transient flow of gas to move in the direction in reverse to the flow of said gas in (b);

(d) said transient reverse flow producing first a rise at a given rate of rise and subsequently a fall in the pressure difference between said gas exit portions and said gas entry portions, said difference produced by said transient reverse flow remaining greater than a first critical minimum difference for a time interval of less than about 150 milliseconds, said first critical difference being that difference at which a steady flow of gas in said reverse direction just produces a localized spill of granular material from said gas entry faces, and said difference produced by said transient reverse flow peaking to a top value beyond a second critical minimum difference, which is the pressure difference at which a transient flow of gas in said reverse direction producing said pressure difference at said rate of rise just initiates a body movement of said granular material toward said gas entry faces to spill a portion of the granular material and substantially all of said accumulated chemically reactive granular medium from the bed;

e. supplying fresh granular material to replace material spilled from said gas entry portions;

f. repeating the cycle of said steps (b), (c), (d), and (e) at least 2 times and then repeating step (b);

g. forwardly flowing gas to be treated through the gas entry portions of the granular material bed and outwardly from the gas exit portions to treat said gas by contact with said surface layer deposits of said chemically reactive medium and wherein either at least a first part of this step (g) occurs simultaneously with a said step (b), the gas in (b) comprising the gas to be treated, or this step (g) is wholly subsequent to said step (b); and h. thereafter repeating steps (c), (d), (e), (b), and (g) in a cyclic manner.

7. The method of claim 6 wherein the rate of addition of said chemically reactive granular medium to said gas of said step (b) is less than about 10 grams per cubic meter of said gas and wherein said gas first enters said gas entry faces at a first velocity greater than about 16 feet per minute while there is added to the gas a first increment of said granular medium until the pressure drop across said surface layer deposits reaches about 0.05 centimeters of water per foot per minute of said first velocity and wherein said gas next enters said gas entry faces at a second velocity greater than about 16 feet per minute while there is added to said gas a second increment of said medium until said pressure drop increases by at least about 0.08 centimeters of water per foot per minute of said second velocity and wherein subsequently the rate of flow of said gas is reduced so that the gas enters said gas entry faces at a third velocity less than about one-half of said first velocity and of said second velocity and also less than about 16 feet per minute while there is added to said gas a third increment of said medium wherein said third increment is at least about 1 times as large as said second increment when said pressure drop increased with the addition of said second increment by about 0.08 centimeters of water per foot per minute and wherein, when said pressure drop increased by a substantially greater amount, said third increment is at least about 1 times as large as the pro rata portion of said second increment that was responsible for an increase of exactly 0.08 centimeters of water per foot per minute.

8. The method of claim 6 wherein said gas to be treated contains particulate matter and wherein said spill from said gas entry faces in (h) includes accumulated particulate matter removed from said gas to be treated.

9. The method of claim 8 wherein said gas contains sulfur dioxide and wherein said chemically reactive granular medium is absorptive in respect to sulfur dioxide.

10. The method of claim 9 wherein said chemically reactive granular medium is selected from the group consisting of slaked lime, slaked fully-calcined dolomite, magnesium hydroxide, nahcolite, and sodium or ammonium carbonate.

11. The method of claim 6 in which said gas to be treated is hot and contains hydrogen sulfide and wherein said chemically reactive medium is finely divided calcium carbonate from the reaction of calcium sulfide with liquid water and carbon dioxide or finely divided lime or slaked lime produced from such calcium carbonate.

12. The method of claim 11 including the steps of separating said chemically reactive medium in said spill from said first granular material in the spill and of reacting calcium sulfide in said separated chemically reactive granular medium with liquid water and carbon dioxide to yield finely divided calcium carbonate.

13. The method of claim 6 in which said gas of step (b) enters said gas entry faces at a velocity greater than about 30 feet per minute to accumulate a first portion of said deposits and wherein subsequently said gas of step (b) enters said gas entry faces at a second velocity below about 16 feet per minute to accumulate a second portion of the deposits and to substantially close up pinholes present in said first portion.

* * * * *